United States Patent
Wenger et al.

(10) Patent No.: US 9,368,043 B1
(45) Date of Patent: Jun. 14, 2016

(54) TRAINING TARGET TAGGING SYSTEM AND RELATED METHOD

(71) Applicants: Jason C. Wenger, Cedar Rapids, IA (US); Angus L. M. T. McLean, Atlanta, GA (US); Brian R. Wolford, Cedar Rapids, IA (US); Matthew M. Lorch, Glen Ellyn, IL (US)

(72) Inventors: Jason C. Wenger, Cedar Rapids, IA (US); Angus L. M. T. McLean, Atlanta, GA (US); Brian R. Wolford, Cedar Rapids, IA (US); Matthew M. Lorch, Glen Ellyn, IL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 286 days.

(21) Appl. No.: 13/961,671

(22) Filed: Aug. 7, 2013

(51) Int. Cl.
*G09B 9/00* (2006.01)

(52) U.S. Cl.
CPC ........................................ *G09B 9/003* (2013.01)

(58) Field of Classification Search
CPC ............ G09B 9/003; G09B 9/09; G09B 9/04; G09B 9/08; G09B 9/52; G09B 9/54; G09B 9/56; G09B 9/006; F41A 33/02
See application file for complete search history.

(56) References Cited

U.S. PATENT DOCUMENTS

| | | | |
|---|---|---|---|
| 2006/0178758 A1* | 8/2006 | Koriat | 700/12 |
| 2012/0156653 A1* | 6/2012 | Wokurka | 434/30 |

* cited by examiner

*Primary Examiner* — Timothy A Musselman
(74) *Attorney, Agent, or Firm* — Angel N. Gerdzhikov; Donna P. Suchy; Daniel M. Barbieri

(57) ABSTRACT

A system and related method is disclosed for applying a training tag to an entity within a training scenario and presenting the entity based on the applied tag. The method receives sensor data from of a plurality of onboard sensors, truth data and state data via a training and tactical network, and simulation data representative of Live, Virtual and Constructive training entities. The method applies Multi Sensor Integration techniques to the received data to display a single presentation where appropriate within the scenario. Based on a defined set of attributes, the method attaches a training specific tag to each integrated representative data set and applies a rules set to determine whether and how to present each received and tagged training entity to a trainee.

20 Claims, 8 Drawing Sheets

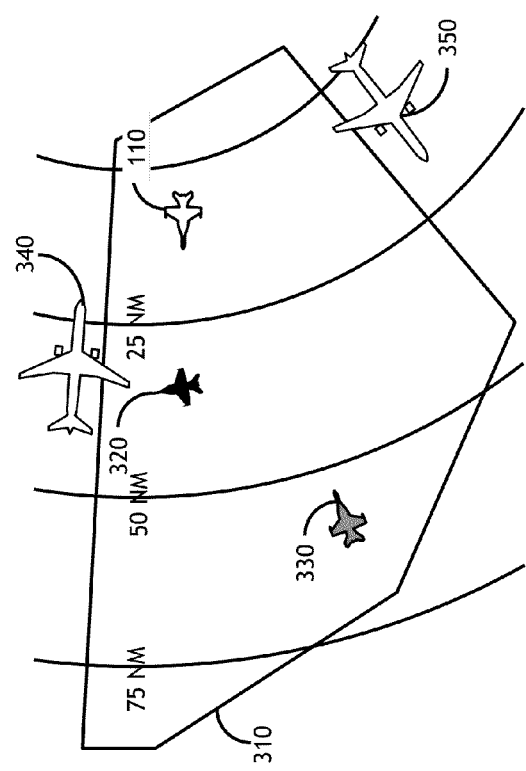
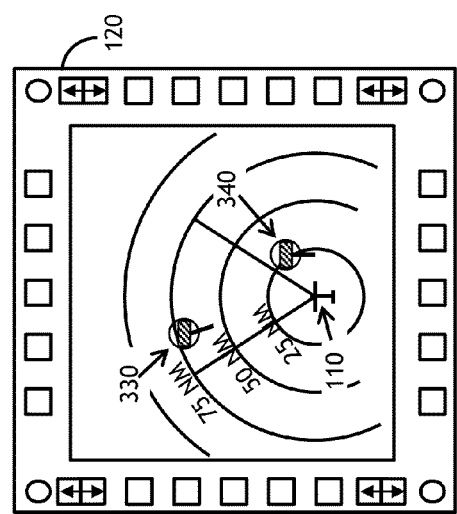
FIG. 6A
FIG. 6B

TRAINING TARGET TAGGING SYSTEM AND RELATED METHOD

FIELD OF THE INVENTION

The present invention relates generally to education of a trainee through trainee assessment of presented situations. More particularly, embodiments of the present invention relate to a system and method for integrated training of a trainee via live, virtual and constructive entities appropriately tagged and displayed to or occluded from the trainee presentation offering an accurate presentation of a desired scenario.

BACKGROUND OF THE INVENTION

Traditional military training systems present displays to a trainee pilot or student which are derived from the aircraft's standard military equipment (e.g., aircraft air-to-air radar, Electro Optical (EO) sensors, tactical data links, Identification Friend or Foe (IFF) systems, and the like). Training data links, when in use, are traditionally used to provide situational awareness to an instructor or a Range Safety Officer (RSO) on the ground. These training data links may be tailored to provide a safety level associated with a single RSO observing the scenario from afar and able to maintain awareness on all scenario players. This presentation may be recorded for post mission player debrief as well as RSO debrief.

A training datalink may broadcast information not available on a traditional tactical datalink. For example, a training datalink by its nature may broadcast information descriptive of a training status of one of the players. In a scenario where friendly (Blue) forces are operating against hostile (Red) forces, the training datalink may broadcast the status of one of the Red players as "alive" or "dead". An alive Red player may be defined as those assets labeled as training aids against which the Blue forces must operate whereas a dead Red player is one simulating a kill by the Blue forces. Conversely, in an operational tactical environment, dead bandits fall to the ground and are no longer able to provide a return to a Blue sensor for broadcast via the tactical datalink.

This additional training related information broadcast on the training datalink is traditionally not integrated in the training aircraft and is not available to training aircraft systems.

Current training scenarios may include additional entities not found in traditional training scenarios. Virtual entities (those simulated entities created through human interaction) as injected into a training scenario may enhance and add a level of difficulty to a training scenario not found in traditional systems. As these additional entities become part of a scenario, traditional systems are unable to categorize and accurately display the entities as desired.

Existing aircraft avionics systems may enable a correlation or multi-sensor-integration (MSI) function. This MSI function accepts data from multiple sensors (for example, a radar and a datalink) and fuses the data to display an accurate presentation to the pilot. Because these two sets of data come from distinct sensor systems, it is necessary to identify the subset of sensor data generated by each sensor that is attributable to same object in the real world environment. For example, by comparing the latitude, longitude, altitude, speed, heading, and other parameters of a target sensed by a radar to the equivalent set of parameters received via a tactical datalink, a set of "matching" targets can be provided, and shown on a common display. This integration results in all the returns from both sensors being presented, however the same object is not shown twice in the situations where two separate sensors independently observe a single target.

In traditional training scenarios, it is common for aircraft playing the role of hostile in the training scenario to be "killed" by simulated missiles during an engagement. In current training, these aircraft remove themselves from the scenario by turning 90 degrees to the fight and "kill removing" from the engagement. As the hostile aircraft are kill removing, each hostile pilot is tasked with exiting the engagement in a most expeditious manner to avoid interfering with the rest of the engagement. The hostile pilot kill removing must fly away from the engagement to attempt to fly outside the radar scan pattern of the Blue forces as not to interfere with the Blue forces tactics against the remaining Red forces. During this time, however, the kill removing aircraft may continue to appear on various aircraft sensors as a training artificiality.

This causes two problems—First, if the pilot is not aware that the aircraft are killed, they may become confused, and continue to engage the aircraft as if they were still an alive part of the scenario. Secondly, as the live aircraft are still in the airspace, the potential for a midair collision exists.

In a combat environment, each sensor will sense each target as it is able, and the MSI function will fuse each of the sensor's data to accurately present information to the pilot. However, in training presentations, a desired scenario may include a target (e.g., a dead Red bandit) kill removing from the fight after being simulated killed by the Blue forces.

Consequently, a need remains for a system and method able to integrate each entity found within a training datalink into a traditional MSI function where a training target is tagged and appropriately displayed based on the associated tag. Such a system may offer a trainee a presentation more accurately representative of a desired scenario than would the traditional integration functions of current art avionics.

SUMMARY OF THE INVENTION

Accordingly, an embodiment of the present invention is directed to a method for tagging a training entity. The method comprises receiving sensor data from at least one of a plurality of sensors, the sensor data associated with the training entity, the sensor data packaged into a first set of data representative of the training entity, the plurality of sensors integrated to present a multi-sensor integrated presentation to a trainee, receiving truth data, the truth data a self-descriptive second set of data representative of the training entity and originated by the training entity, the truth data broadcast via a training network, receiving state data via the training network, the state data packaged into a third set of data representative of the training entity, receiving simulation data, the simulation data a fourth set of data representative of the training entity, integrating each set of data representative of the training entity to determine if more than one set of data representative of the training entity represents a single training entity, the single training entity a portion of a training objective, attaching a training entity tag to the integrated set of data representative of the training entity, the training entity tag a descriptive identifier of the training entity, receiving a presentation rules set, the presentation rules set including a presentation identifier, determining whether to present the training entity, the determining based on the training entity tag and the presentation rules set, and presenting the training entity to the trainee on a trainee presentation based on the determining, the presenting including a portion of the integrated set of data representative of the training entity and the presentation identifier.

An additional embodiment of the present invention includes a method where the training entity is at least one of: a plurality of airborne and surface based entities, a plurality of subsurface entities, a plurality of space based entities and a plurality of Live, Virtual and Constructive challenges to the trainee and the plurality of sensors includes at least one of: a radar, an Identification Friend or Foe (IFF), a Radar Warning Receiver (RWR), a sensor pod, a sonar and an infrared sensor.

An additional embodiment of the present invention includes the sensor data and truth data are representative of a Live training entity, the state data is representative of one of: a Live, Virtual and Constructive training entity and the simulation data is representative of Constructive training entity, the simulation data is originated via one of: an onboard data source and a remote data source.

An additional embodiment of the present invention includes integrating each set of data representative of the training entity further comprising: receiving each set of data representative of the training entity, comparing a first set of data representative of the training entity with a second set of data representative of the training entity, determining if the first and second set of data representative of the training entity represent a single training entity, determining which of the first and second set of data representative of the training entity is a desired set of data representative of the training entity, and transmitting the desired set of data representative of the training entity.

An additional embodiment of the present invention includes a method where the training entity tag is one of: alive, dead, unknown, bogey, bandit, friendly, neutral, hostile, civilian, cyclops, outlaw and spades.

An additional embodiment of the present invention includes a presentation rules set further comprising storing the presentation rules set within an onboard data source and presenting the training entity to the trainee on a trainee presentation further comprises displaying the training entity to a trainee pilot within a flight deck display.

An additional embodiment of the present invention includes a non-transitory computer readable medium having non-transitory computer readable program code embodied therein for tagging a training entity, the computer readable program code comprising instructions which, when executed by a computer device or processor, perform and direct the steps of receiving sensor data from at least one of a plurality of sensors, the sensor data associated with the training entity, the sensor data packaged into a first set of data representative of the training entity, the plurality of sensors integrated to present a multi-sensor integrated presentation to a trainee, receiving truth data, the truth data a self-descriptive second set of data representative of the training entity and originated by the training entity, the truth data broadcast via a training network, receiving state data via the training network, the state data packaged into a third set of data representative of the training entity, receiving simulation data, the simulation data a fourth set of data representative of the training entity, integrating each set of data representative of the training entity to determine if more than one set of data representative of the training entity represents a single training entity, the single training entity a portion of a training objective, attaching a training entity tag to the integrated set of data representative of the training entity, the training entity tag a descriptive identifier of the training entity, receiving a presentation rules set, the presentation rules set including a presentation identifier, determining whether to present the training entity, the determining based on the training entity tag and the presentation rules set, and presenting the training entity to the trainee on a trainee presentation based on the determining, the presenting including a portion of the integrated set of data representative of the training entity and the presentation identifier.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 6A and 6B are a diagrams of a training scenario (6A) and an associated trainee presentation (6B) exemplary of an embodiment of the present invention;

DETAILED DESCRIPTION OF THE INVENTION

Figure 1:
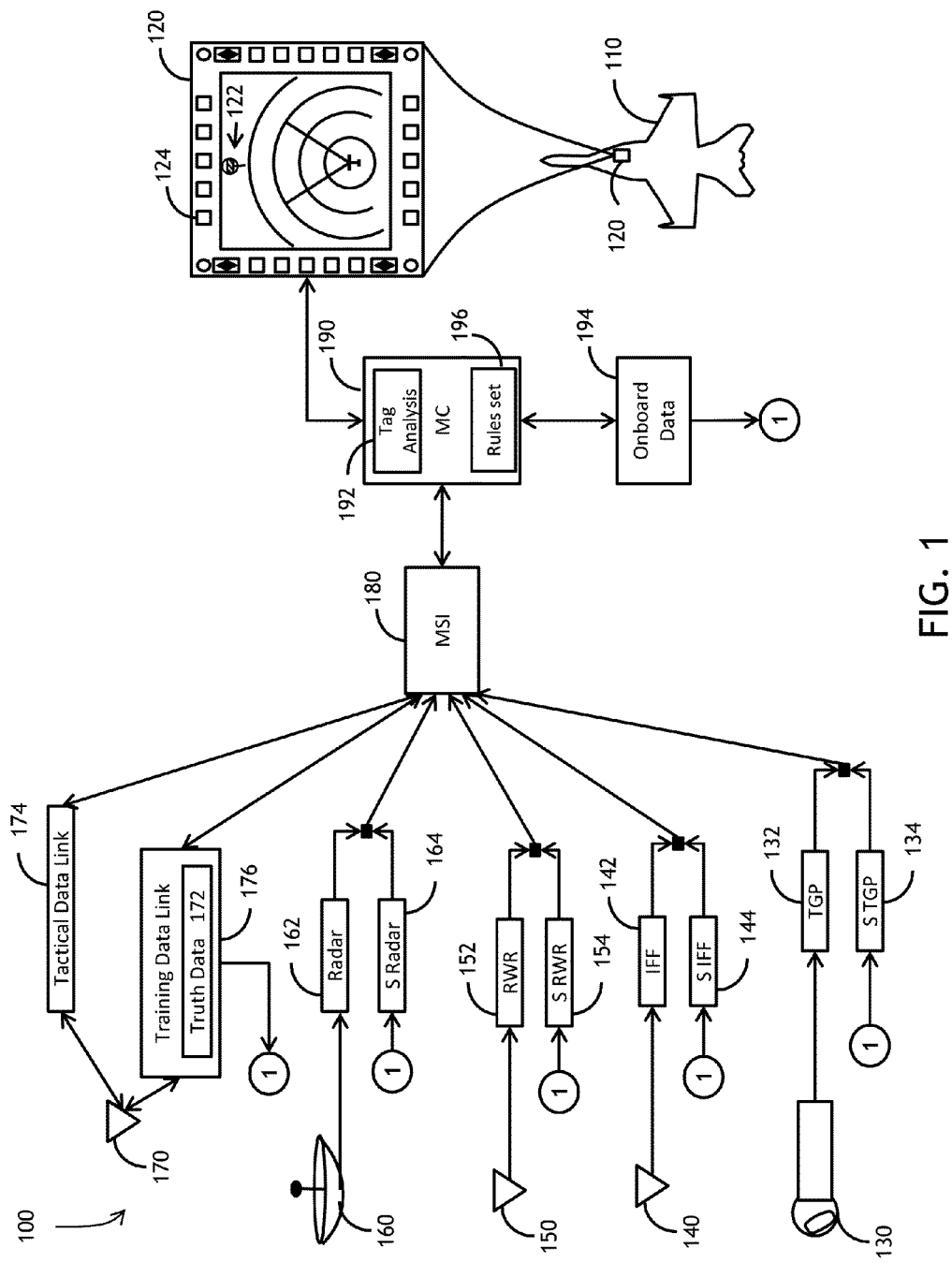
FIG. 1 is a block diagram of a training target tagging system exemplarily mounted on an airplane in accordance with an embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a system and method for training target tagging enabling selective presentation of a tagged target within a trainee presentation. The selective display of an entity may provide for a highly accurate presentation of a desired training scenario. As described herein, embodiments of the present invention are exemplarily described as they relate to a system and method incorporated within a trainee aircraft. This exemplary aircraft embodiment is meant as a non-limiting embodiment of the present invention. It is contemplated herein; embodiments of the present invention may be incorporated into large scale training scenarios within a variety of platforms and communications media.

Certain aspects of the present invention relate to U.S. patent application Ser. No. 13/608,367 entitled "TRAINING DATA MANAGEMENT METHOD AND RELATED SYSTEM", filed on 10 Sep., 2012, which is hereby incorporated by reference in its entirety. Additionally, this invention may be preferably functional in a training scenario including Live Virtual Constructive (LVC) entities—such that Virtual and Constructive training targets may be injected into the training scenario. These training targets may be processed by a simulated sensor, which would generate simulated sensor returns, and those returns are merged with Live sensed returns before being processed by the MSI function. Thus, the MSI outputs may contain a combination of Live, Virtual, and Constructive returns.

Embodiments of the present invention may remove training artificialities associated with training scenarios incorporating actual aircraft. Embodiments herein may also allow training sensor systems to be used as real-world safety-of-flight monitors by injecting live entities into training datalink and enable injection of virtual participants via datalink into LVC exercises. Methods herein may further provide scalable complexity in training scenarios to adapt difficulty to trainee proficiency and enhance training safety.

For example, a given training scenario may require at least three types of players: Live assets (such as an actual aircraft flying on a weapons range), Virtual assets (such as a pilot operating a simulator at a ground-based location), and Constructive assets (those objects generated and operated by an algorithm on a computer device).

As used herein, the following terms are defined as follows:
Live—an entity of actual presence;
Virtual—an entity created via human interaction and responding to human interaction;
Constructive—an entity created by algorithms on a computing device and acting based on computer calculations and instructions;
Player—a participant in a training scenario;
Blue—friendly forces;
Red—unfriendly forces;
Alive—a status of a player as operable;
Dead—a status of a player indicating killed/inoperable.

As used herein, a training datalink may include any information network available within a training space. One example may include a secure or unsecure data link broadcast via RF and receivable by entities within the training space which maintain that capability. An additional example may include a wired network training space where each player maintains wired connectivity to other players in the training space.

Referring to FIG. 1, a block diagram of a training target tagging system exemplarily mounted on an airplane in accordance with an embodiment of the present invention is shown. Trainee aircraft 110 may include a fighter aircraft in which trainee is learning to tactically operate. Within trainee aircraft 110 trainee presentation 120 includes various visual communications media available for trainee to operate trainee and for system 100 to interact with trainee. Training entity 122 may be visually displayed on trainee presentation 120 in accordance with a desired training scenario. Trainee presentation may further include all sensory media available for trainee to perceive a training scenario. For example, audio, visual, tactile and olfactory communications may aid system 100 in communication with trainee.

Trainee presentation 120 may include two way communications for trainee to communicate with system 100. Option Selection Buttons (OSB) 124 may provide a medium for trainee to interact with system 100. Contemplated herein, additional forms of communication may enable trainee to communicate with system 100 including well-known voice recognition and additional Hands on Throttle and Stick (HOTAS) controls.

Actual sensors onboard trainee aircraft may aid trainee in operational performance. Targeting pod system 130/132, IFF antenna 140 and receiver 142, RWR antenna 150 and receiver 152, and radar antenna 160 and receiver 162 may be examples of active and passive sensors configured for operational requirements of the trainee aircraft 110. In certain situations, actual sensors may be unable to provide trainee with an accurate presentation of a desired scenario.

Simulated sensors may add complexity to the training scenario presented to trainee when actual sensors are incapable, inoperable, or not installed. Simulated targeting pod 134, simulated IFF 144, simulated RWR 154 and simulated radar 164 may add color to a training scenario. For example, if training aircraft 110 has a non-operational radar, simulated radar 164 may act as a simulated sensor and provide trainee with a presentation similar to an actual radar presentation. Each training entity 122 displayed to trainee may look and act exactly as an actual radar contact would look. The origin of the training entity is transparent to trainee.

One origin of simulated sensor data may include data received via a training data link 176 via data link antenna 170. Training aircraft 110 may receive a simulated data set representative of a simulated radar contact. System 100 may receive this simulated data set and display the training entity 122 to trainee as if the radar contact were actual. Additionally, a second origin of simulated sensor data may include an onboard data source 194. A trainee may launch on a mission having loaded an onboard data source with a complete training scenario with multiple training entities included in the onboard data source 194. It is contemplated herein; a solo trainee aircraft 110 may fly a complete mission operating against Virtual and Constructive training entities where the trainee is unaware of the non-presence of actual threat aircraft.

Tactical data link 174 may be an additional source of targeting information for trainee. Well-known Link-16 and Situational Awareness Data Link (SADL) information may aid trainee in operational capabilities. Truth data 172 may be received Live entities may broadcast actual state data within training datalink usable by embodiments of the present invention. Actual state data or "truth" data may be broadcast via the training datalink and usable to determine which entities are presentable at a specific location. For example, a Live entity may broadcast truth data via the training data link while the training aircraft may receive the truth data via datalink. The training aircraft may also receive raw radar data associated with the same live entity. System 100 may distinguish between the two sets of data and determine that each set of data may represent the same target. Thus, a single target (the Live entity) may be accurately displayed on the trainee presentation.

As organized by data type, the chart below indicates the sensor type, a type of training entity and the associated medium of reception:

| Sensor Type | Training entity | Received via |
| --- | --- | --- |
| Actual Sensor | Live | Actual Sensor |
| Simulated Sensor | Constructive | Training Network |
|  |  | Onboard Data Source |
| Truth Data | Live | Training Network |
| State Data | Live | Training Network |
|  | Virtual | Tactical Network |
|  | Constructive | |

Once each actual sensor or simulated sensor outputs a training entity, system 100 may further fuse the outputs to a single output recognizable by Multi-Sensor Integration (MSI) function 180. Just as trainee may be unaware of an origin of a training entity, MSI function 180 may be unaware of the training entity origin. MSI function 180 may receive a set of data representative of a training entity and determine which set of data is associated with each training entity. For example, one training scenario may include a Live target flying 4 miles in trail of a Constructive target. MSI function may receive a first set of data via training datalink 176 representative of the Constructive target as well as a second set of data via aircraft radar 160 representative of the Live target. MSI will receive these two sets of data and output two individual targets to Mission Computer (MC) 190.

Should MSI function 180 also receive a third set of data representative of Live target from the targeting pod 130, MSI function 180 will determine the three sets of data only represent two distinct targets and output the same two targets to MC 190 as before.

The output of the MSI function 180 may include a set of tracks; each set may contain several sets of data. For example, one set of data may include state parameters such as position, altitude, velocity, etc. Theses sets of data may also include information about how the track correlates against source data from individual sensors (e.g., live radar, simulated radar, tactical datalink, and training datalink).

One aspect of system 100 is maintaining a record the attributes of a training entity, such as Live, Virtual, or Constructive. MC 190 may maintain a memory source within, for example, onboard data source 194 in which to record and store these attributes. System 100 may proceed with updates of each training entity through MSI function 180 so that each training entity is presented as desired by the training scenario.

MC 190 also maintains the tag analysis 192 as well as the rule set 196 for system 100 proper presentation of training entities. A rules set 196 of configurable rules which define what conditions cause a track to be displayed differently because of the training entity attributes. In a preferred embodiment, the rules set 196 is a preloaded configuration file stored within an onboard data source 194 before a training event. Preferably, a well-known hand held data cartridge may function to transfer data from a offboard source to the onboard data source 194. As the training scenario progresses, system 100 makes reference to rules set 196 to determine whether and how to present training entities to the trainee.

Rules set 196 may further be configurable for each type of training scenario. For example, a Defensive Counter Air (DCA) mission may require a rules set 196 tailored for specific expected airborne threats while an Interdiction (INT) mission may require a rules set 196 tailored more for an expected surface to air threat. Rules set 196 may be standardized as part of a specific training curriculum on a per-mission basis.

Within MC 190 system 100 maintains tag analysis 192 to analyze the training entity tag associated with a set of data representative of a training entity. The training entity tag functions as a descriptive identifier of the training entity and is attached to the integrated set of data representative of the training entity. In addition, Rules set 196 may include rules for MC 190 to analyze a presentation identifier included with the training entity tag. A presentation identifier may include specific presentation requirements such as 1) display only if a midair collision threat or 2) display only if an air to air threat.

In a preferred embodiment, system 100 commands MC 190 to analyze each tag associated with each integrated set of data representative of the training entity. This analysis may include a comparison between the associated tag and the rules set 196 to determine proper presentation of the training entity 122.

Origination of the tag may come from a plurality of sources. One such source may include onboard data associated with the mission computer on an aircraft. As the mission computer receives information related to a target, the mission computer may analyze the information and attach the appropriate tag supplied from the onboard data source 194 and based on the rules set. System 100 may define a set of tags based on requirements of a specific training scenario and attach a tag to each integrated set of data representative of each training entity. Preferably, this set of tags may make up part of the Interface Control Document (ICD) of the overall flight deck.

Alternatively, the tag may originate from a training entity broadcasting truth data 172 via the training data link 176. Each training entity may broadcast ownship position, heading, airspeed (truth data) and a training tag associated with a current status in the training scenario. Each tag may include additional self-descriptive information such as a weapons load and mission status.

Further, a supervisory player may attach a training tag to a specific training entity. For example, an RSO operating remotely from the training scenario may attach a training tag to one or more training entities based on an RSO rule set.

Regardless of the source of the training tag data, system 100 may enable the flight deck trainee presentation 120 to use the defined tags, along with its own set of display/behavior rules and activation criteria, to alter its behaviors under the selected circumstances as described above. These rules and activation criteria could be selectable and rule-based, or they could be built as a permanent feature of the flight deck.

A training tag may possess a plurality of descriptive attributes. For example, one training tag may detail aircraft type and threat capabilities. This training tag may indicate a MIG-29 aircraft with a specific weapons load. An additional example of a training tag may indicate a signature capability of the Blue forces. For example, a Blue 1 fighter may possess an operational radar capable of reading the radar signature of an unknown Red bandit. This Blue 1 fighter may then transmit a training tag associated with the set of data representative of the Red bandit to additional Blue fighters who may not possess such radar signature capability.

Additionally, one embodiment of the present invention may provide an abbreviated pointer to preloaded information to reduce onboard processing requirements. One training tag may indicate an abbreviated pointer (e.g., a data set less than one full data set required for full ID of the threat) for a lookup table method of reduced processing requirements.

Once system 100 tags the MSI output tracks, the remainder of the flight deck trainee presentation 120 may perform different behaviors under specific, defined circumstances.

System 100 merges sets of data representative of the training entity in a way to maintain referential integrity of the desired presentation. For example, a simple exemplary training scenario may include a single Live Blue trainee aircraft operating against a single Live Red training aid. The Live Red training aid is actually an F-16 from the same squadron as the Blue trainee however the training scenario calls for tactical operations against a MIG-29 target. Embodiments of the present invention may receive data from a plurality of sources (including training data link 176, tactical data link 174, and the trainee aircraft radar 160) and fuse the data sets such that the trainee aircraft presentation accurately displays a single contact. System 100 analyzes the associated training tag and presents the single contact as a MIG-29 target.

System 100 may accurately display the target based on the tag and also based on the rules set including physical characteristics of each entity in the scenario. For example, a Live Red training aid may have physical properties dissimilar from the Red entity it is simulating. A Live Red training aid may have a radar cross section (RCS) dissimilar from the MIG-29 being simulated. System 100 may display within trainee presentation 120 a radar return at an appropriate range for Blue trainee actual radar to sense the MIG-29 regardless of the range the Blue trainee actual radar 160 senses the target.

System 100 maintains safety as a priority in training scenarios. As system 100 is training specific, a system flag may enable and disable the training tagging function or the trainee presentation 120, at an aircraft-wide level. When disabled, either the tagging function would not apply tags, or the flight deck would not alter behaviors based on them or both.

Figure 2:
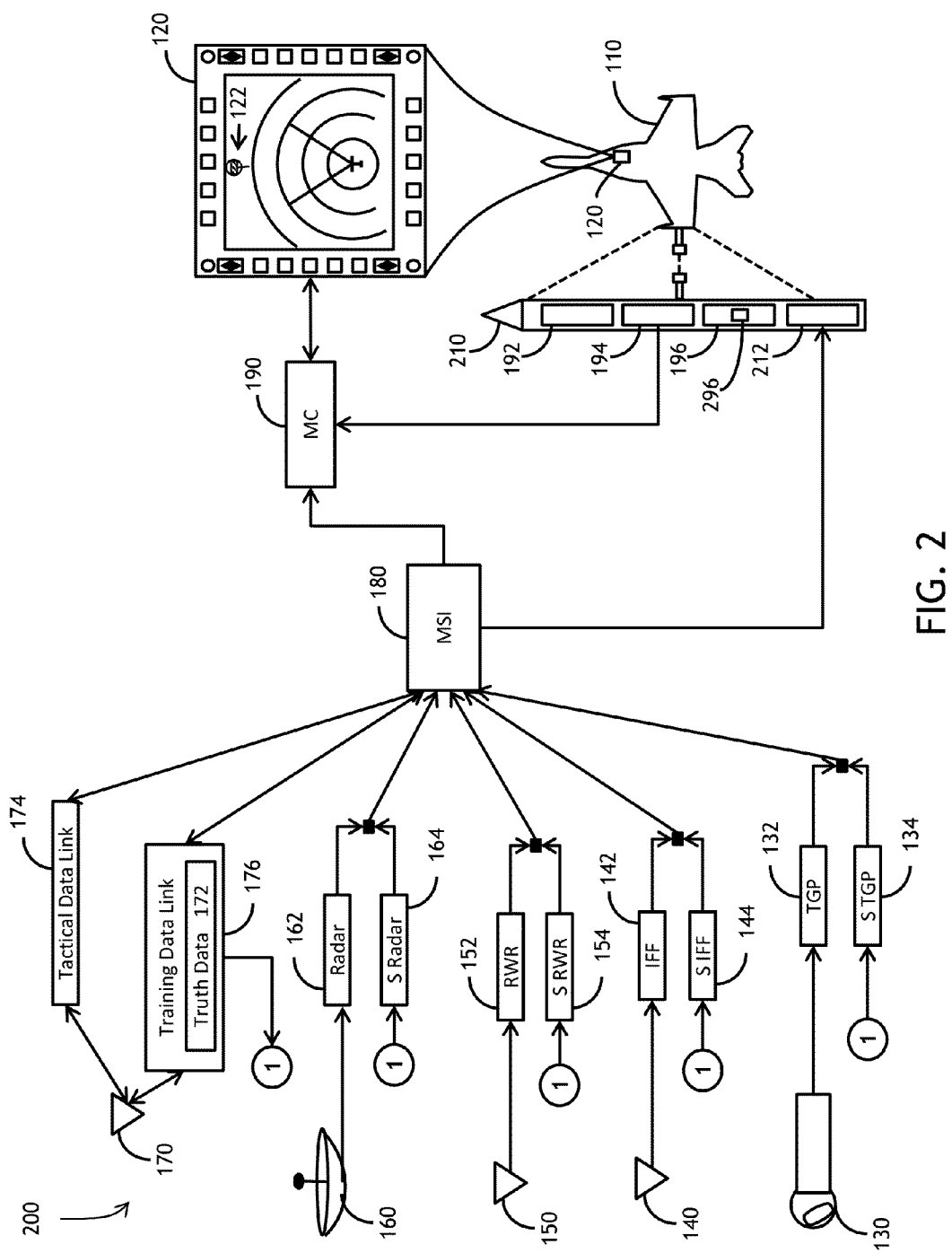
FIG. 2 is a block diagram of a training target tagging system exemplarily mounted on an external pod attached to an airplane in accordance with an embodiment of the present invention.

Referring to FIG. 2, a block diagram of a training target tagging system exemplarily mounted on an external pod attached to an airplane in accordance with an embodiment of the present invention is shown. In an additional embodiment of the present invention, system 200 may implement the tagging function and analysis 192 entirely within a detachable training pod 210. In this configuration, the training pod 210 may receive, via wired access or wireless transmitter receiver 212, integrated sets of data representative of a training entity produced by MSI function 180, and would perform the similar training tag attachment and analysis function as system 100. Rules set 196 may be based on a configuration file provided in the training pod 210 as well as on a detachable data load card 296 in the training pod 210. Rather than being inline, this implementation may reside in a parallel processing step. System 200 may provide the training pod 210 production of a separate stream of data consisting of an association of unique IDs of tracks along with the training tags attached to each ID. In this case, the training tags may, for example, be embedded within a data file of the pod. In one example, the data file may represent part of the pod's ICD.

Figure 3:
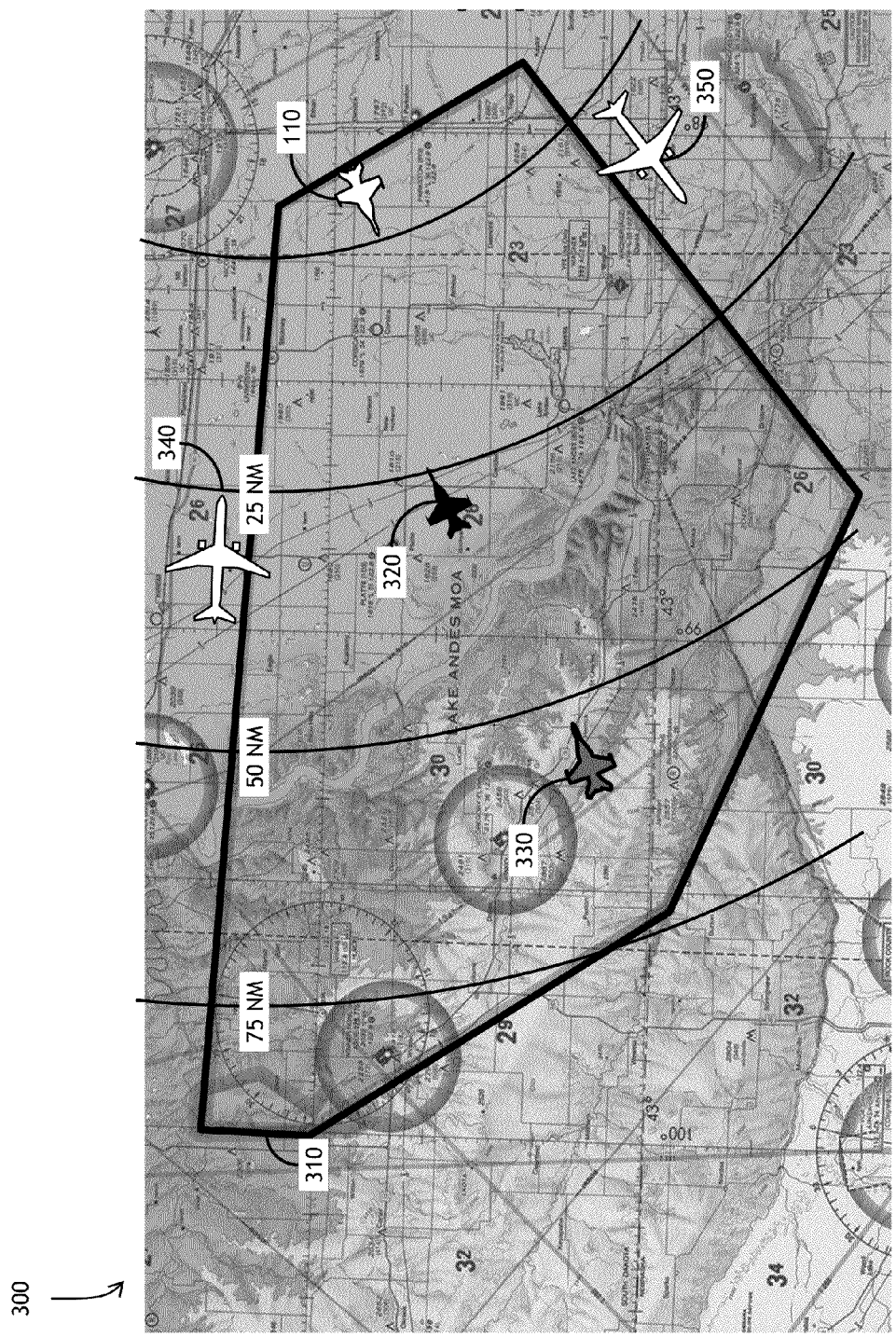
FIG. 3 is a diagram of an exemplary area of operations in which an embodiment of the present invention may function.

Referring to FIG. 3, a diagram of an exemplary area of operations in which an embodiment of the present invention may function is shown. A training scenario may take place within airspace 310 defined by geographical boundaries. Blue trainee aircraft 110 operates against a multi-threat Red force including Live Red alive bandit 320 and Constructive Red alive bandit 330. Along either side of airspace 310 are Live Interloper alive hot 340 and Live Interloper alive cold 350. An air-to-air adversary may be considered "hot" when the aspect of the adversary is zero to 90 degrees (e.g., the adversary is pointing at the Blue trainee aircraft 110). Conversely, a "cold" adversary is one displaying a 90 to 180 degree aspect to the blue trainee aircraft 110 (e.g., pointing away from the Blue trainee and not a threat). In general, a hot adversary may represent a greater threat than does a cold adversary. In the case of one of the interlopers 340, 350, neither represents a lethal threat to Blue trainee aircraft 110 outside of a midair collision threat. System 100 may receive each of these sets of data representative of the training entities and appropriately display to trainee based on the rules set 196 and training analysis 192.

Figure 4A:
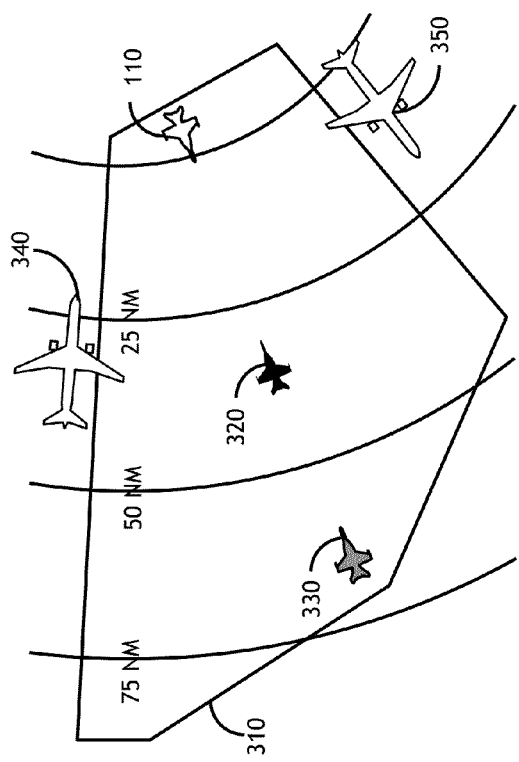
FIGS. 4A and 4B are diagrams of a training scenario (4A) and an associated trainee presentation (4B) exemplary of an embodiment of the present invention.
Figure 4B:
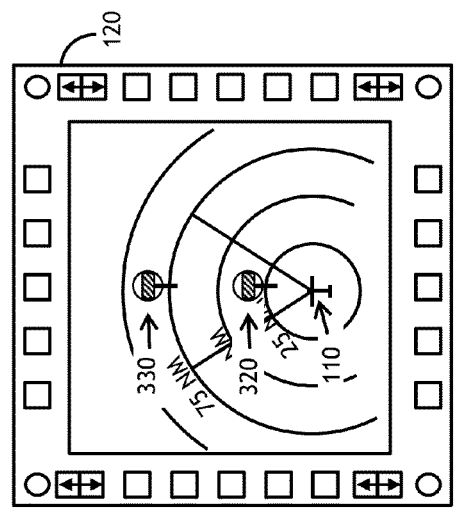

Referring to FIGS. 4A and 4B, diagrams of a training scenario (4A) and an associated trainee presentation (4B) exemplary of an embodiment of the present invention are shown. In one example, a track which appears on a live sensor such as radar 160, but is not reporting its state on the training datalink, may be tagged an interloper aircraft that is not participating in the training scenario. This may be a civil airliner flying near the training area, or a general aviation aircraft flying at low level through the training area. The tagging function would apply an "interloper" tag against a track that matches those criteria. Once a track is identified as an interloper, varying behaviors may be defined for such a track.

If training is for an introductory trainee, and if the interloper target is distant from the training aircraft, a defined behavior may be to remove the target from the display in order to "sanitize" the training area—by hiding targets which are unrelated to the training, the introductory trainee will not be confused by these extra tracks, allowing for better learning with less confusion. For a more advanced trainee, the additional clutter may be retained to increase difficulty.

As in FIG. 3, the players remain the same while trainee presentation 120 presents to the trainee. Trainee aircraft 110 appears in the lower section of trainee presentation 120 for situational awareness of the training scenario. Range rings of 25, 50, 75 and 100 NM may be the selected scale of the current presentation Live Red alive bandit 320 and Constructive Red alive bandit 330 are presented to trainee as objectives of the training scenario. As before, it is transparent to trainee the source of the displayed data. In the present example, Live Red alive bandit is being sensed by trainee radar 160 while Constructive Red alive bandit is being received via training datalink 176. Both Live interlopers 340 and 350 are being sensed by trainee radar 160 however the Interloper tag precludes display of each based on the rules set 196.

Figure 5A:
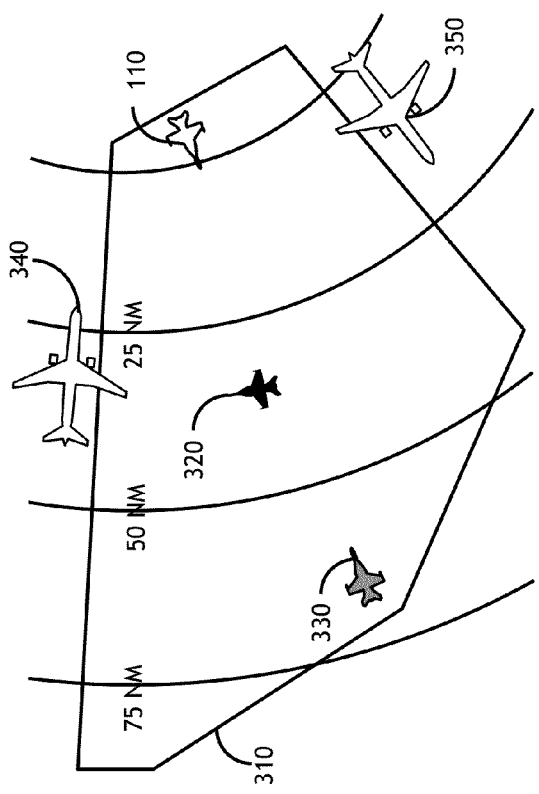
FIGS. 5A and 5B are a diagrams of a training scenario (5A) and an associated trainee presentation (5B) exemplary of an embodiment of the present invention.
Figure 5B:
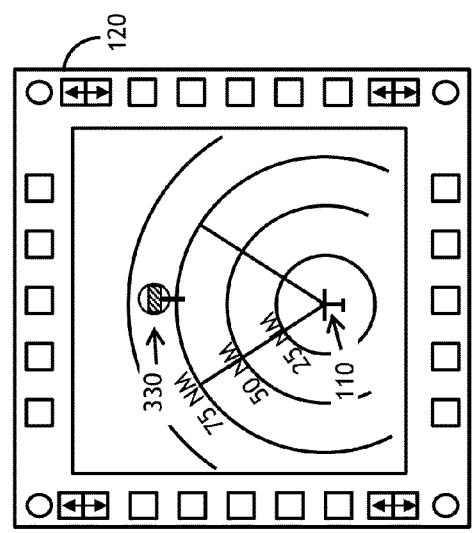

Referring to FIGS. 5A and 5B, diagrams of a training scenario (5A) and an associated trainee presentation (5B) exemplary of an embodiment of the present invention are shown. After trainee aircraft has employed weapons and killed training entity 320, training entity 320 status changes to Live Red dead. System 100 may change the training tag from alive to dead representative of the new status of entity 320. Trainee display is updated as well indicating Constructive Red alive entity 330 as a single alive threat to trainee aircraft. System 100 maintains the Interloper tag on entities 340, 350, and tag analysis 192 coupled with rules set 196 maintains their absence from trainee presentation 120.

System 100 removes each training entity maintaining the dead tag from the trainee presentation 120. The result is "killed" aircraft are removed from the scenario completely, as they would in an actual engagement after being shot down, rather than continuing to be observed by sensors while they kill remove from the scenario. In this example, system 100 is configured to identify tracks which have a representation on the training datalink, and if that representation shows a damage attribute of "Destroyed", then system 100 applies a "dead" tag to that track.

As a safety precaution, system 100 may be further enhanced to inhibit this removal if the Live Red dead 320 aircraft is close (e.g., <15 nm or approaching anticipated visual range) to the trainee aircraft 110 to allow mitigation of a midair collision potential. In this case, rules set 196 may enable the trainee presentation 120 to show such aircraft with a special symbol indicating a kill-removed aircraft that is leaving the training scenario. This would allow for trainee awareness of the presence of the Live aircraft and its status as dead within the training scenario.

Referring to FIGS. 6A and 6B, diagrams of a training scenario (6A) and an associated trainee presentation (6B) exemplary of an embodiment of the present invention are shown. As trainee aircraft 110 maneuvers to the north, range to Interloper 340 decreases to a level where rules set determines a requirement to present Live Interloper alive hot 340 to trainee presentation 120. System 100 still maintains presence of Constructive Red alive entity 330 and an absence of Live Interloper alive cold 350 on trainee display.

In a training scenario including an RSO, system 100 may be overridden by an input from the RSO determining the necessity of when the target tagged as an Interloper may be displayed to the players. For example, should the interloper be sensed by a Blue forces radar, yet be distant from each player by an exemplary 15 NM or more, the RSO may determine no threat exists and remove the interloper from each players display to de-clutter each presentation. Conversely, should a player come within a specified range from or on a collision course with the Interloper, the RSO may allow the interloper to be displayed on each presentation. In addition, one portion of the rule set may include an automatic presentation of any traffic within the specified range of a player.

System 100 may alternatively highlight a track or provide audio alerting to draw the pilots attention to reduce the chance of a midair collision should an interloper track come very close to the training aircraft (closer than 15 nm, for example). Such altering would represent an undesirable negative training if the track was a participant in the training scenario, but would improve safety if the track was tagged an interloper.

Figure 7A:
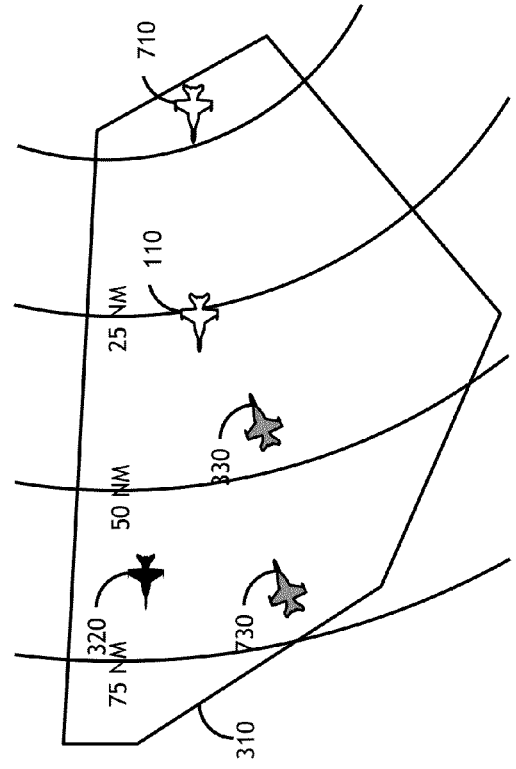
FIGS. 7A and 7B are a diagrams of a training scenario (7A) and an associated trainee presentation (7B) exemplary of an embodiment of the present invention.
Figure 7B:
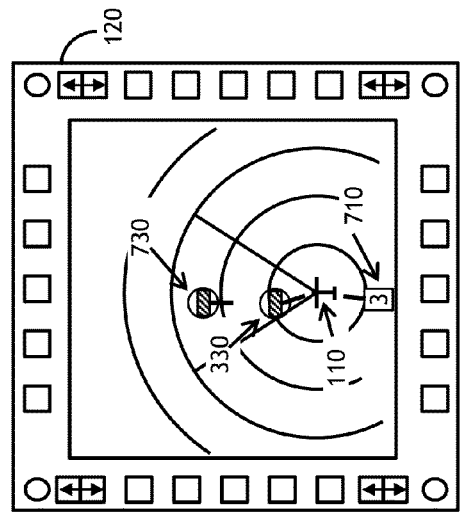

Referring to FIGS. 7A and 7B, diagrams of a training scenario (7A) and an associated trainee presentation (7B) exemplary of an embodiment of the present invention are shown. As a continuation of the training scenario, additional entities may be added to the trainee presentation 120 to increase difficulty. As before, Constructive Red alive entity 330 is presented as the closest threat to trainee aircraft 110. The addition of Virtual Blue alive wingman 710 is displayed approximately 25 NM in trail of trainee aircraft 110. In addition, Constructive Red alive entity 730 is displayed at 50 NM from trainee aircraft. Introduction of additional entities to the scenario adds complexity to the trainee problem and to the system for an accurate presentation.

In an additional implementation of the present invention, a large force exercise including variable platforms may function using embodiments of the present invention. A fleet exercise including ships, aircraft and submarines may be configured with embodiments of the present invention to include specific sensors tailored to the mission. For example, a simulated sonar may replace targeting pod 130 as one sensor while a sea surface radar may function in place of radar 160. Embodiments herein may be tailored to a variety of platforms and specific sensors enabling increased mission performance.

Moreover, a soldier borne system maintaining a limited processing power may function with embodiments herein in use. Large ground forces training exercises connected via training network and centered around a common objective may function with embodiments of the present invention offering successful integration with limited man-carried processing power.

Figure 8:
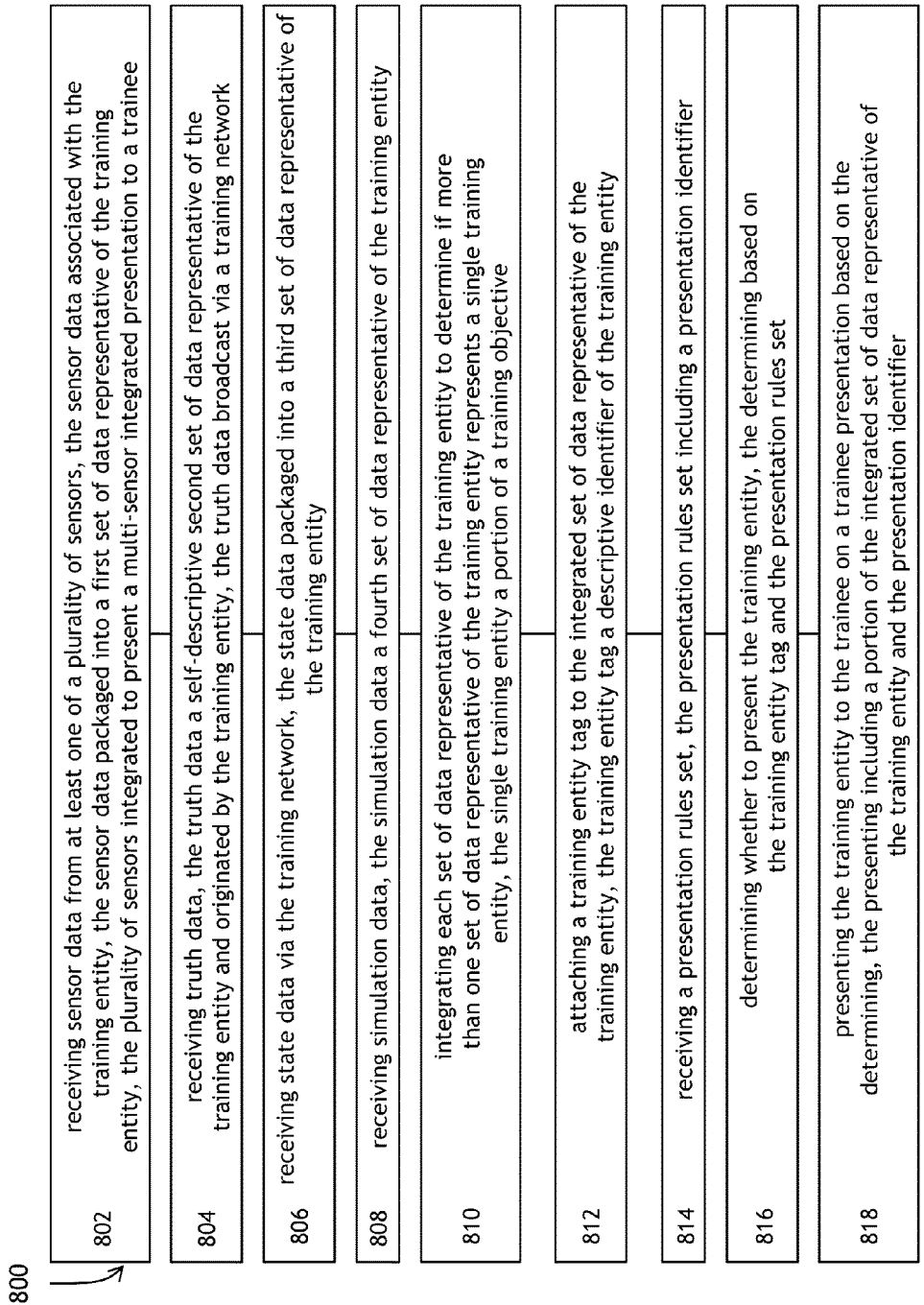
FIG. 8 is a flow diagram of a method for training target tagging exemplary of an embodiment of the present invention.

Referring to FIG. 8, flow diagram of a method for training target tagging exemplary of an embodiment of the present invention is shown. Method 800 begins at step 802, with receiving sensor data from at least one of a plurality of sensors, the sensor data associated with the training entity, the sensor data packaged into a first set of data representative of the training entity, the plurality of sensors integrated to present a multi-sensor integrated presentation to a trainee; and, at step 804, with receiving truth data, the truth data a self-descriptive second set of data representative of the training entity and originated by the training entity, the truth data broadcast via a training network; and, at step 806, with receiving state data via the training network, the state data packaged into a third set of data representative of the training entity; and, at step 808, with receiving simulation data, the simulation data a fourth set of data representative of the training entity. Method 800 continues at step 810, with integrating each set of data representative of the training entity to determine if more than one set of data representative of the training entity represents a single training entity, the single training entity a portion of a training objective; and, at step 812, with attaching a training entity tag to the integrated set of data representative of the training entity, the training entity tag a descriptive identifier of the training entity; and, at step 814, with receiving a presentation rules set, the presentation rules set including a presentation identifier; and, at step 816, with determining whether to present the training entity, the determining based on the training entity tag and the presentation rules set; and, at step 818, method 800 concludes with presenting the training entity to the trainee on a trainee presentation based on the determining, the presenting including a portion of the integrated set of data representative of the training entity and the presentation identifier.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for tagging a training entity, comprising:
receiving sensor data from at least one of a plurality of sensors, the sensor data associated with the training entity, the sensor data acquired via sensor manipulation by a trainee, the sensor data packaged into a first set of data representative of the training entity, the plurality of sensors including at least one of a targeting pod, an identification friend or foe, a radar warning receiver, and a radar, the plurality of sensors integrated to present a multi-sensor integrated presentation to the trainee;
receiving truth data, the truth data a self-descriptive second set of data representative of the training entity and originated by the training entity, the truth data broadcast via a training network;
receiving state data via the training network, the state data packaged into a third set of data representative of the training entity;
receiving simulation data, the simulation data a fourth set of data representative of the training entity;
integrating each set of data representative of the training entity to determine if more than one set of data representative of the training entity represents a single training entity, the single training entity a portion of a training objective;

attaching a training entity tag to the integrated set of data representative of the training entity, the training entity tag a descriptive identifier of the training entity;

receiving a presentation rules set, the presentation rules set including a presentation identifier;

determining whether to present the training entity, the determining based on the training entity tag and the presentation rules set; and presenting the training entity to the trainee on a trainee presentation based on the determining, the presenting including a portion of the integrated set of data representative of the training entity and the presentation identifier.

2. The method for tagging a training entity of claim 1, wherein the training entity is at least one of: a plurality of airborne and surface based entities, a plurality of subsurface entities, a plurality of space based entities and a plurality of Live, Virtual and Constructive challenges to the trainee.

3. The method for tagging a training entity of claim 1, wherein the plurality of sensors includes at least one of: a radar, an Identification Friend or Foe (IFF), a Radar Warning Receiver (RWR), a sensor pod, a sonar and an infrared sensor.

4. The method for tagging a training entity of claim 1, wherein the sensor data and truth data are representative of a Live training entity.

5. The method for tagging a training entity of claim 1, wherein the state data is representative of one of: a Live, Virtual and Constructive training entity.

6. The method for tagging a training entity of claim 1, wherein the simulation data is representative of Constructive training entity, the simulation data is originated via one of: an onboard data source and a remote data source.

7. The method for tagging a training entity of claim 1, wherein
integrating each set of data representative of the training entity further comprises:
receiving each set of data representative of the training entity;
comparing a first set of data representative of the training entity with a second set of data representative of the training entity;
determining if the first and second set of data representative of the training entity represent a single training entity;
determining which of the first and second set of data representative of the training entity is a desired set of data representative of the training entity; and
transmitting the desired set of data representative of the training entity.

8. The method for tagging a training entity of claim 1, wherein the training entity tag is further received via the training network and is at least one of:
alive, dead, unknown, bogey, bandit, friendly, neutral, hostile, civilian, cyclops, outlaw and spades.

9. The method for tagging a training entity of claim 1, wherein
receiving a presentation rules set further comprises storing the presentation rules set within an onboard data source.

10. The method for tagging a training entity of claim 1, wherein
presenting the training entity to the trainee on a trainee presentation further comprises displaying the training entity to a trainee pilot within a flight deck display.

11. A non-transitory computer readable medium having non-transitory computer readable program code embodied therein for tagging a training entity, the computer readable program code comprising instructions which, when executed by a computer device or processor, perform and direct the steps of
receiving sensor data from at least one of a plurality of sensors, the sensor data associated with the training entity, the sensor data acquired via sensor manipulation by a trainee, the sensor data packaged into a first set of data representative of the training entity, the plurality of sensors including at least one of a targeting pod, an identification friend or foe, a radar warning receiver, and a radar, the plurality of sensors integrated to present a multi-sensor integrated presentation to the trainee;
receiving truth data, the truth data a self-descriptive second set of data representative of the training entity and originated by the training entity, the truth data broadcast via a training network;
receiving state data via the training network, the state data packaged into a third set of data representative of the training entity;
receiving simulation data, the simulation data a fourth set of data representative of the training entity;
integrating each set of data representative of the training entity to determine if more than one set of data representative of the training entity represents a single training entity, the single training entity a portion of a training objective;
attaching a training entity tag to the integrated set of data representative of the training entity, the training entity tag a descriptive identifier of the training entity;
receiving a presentation rules set, the presentation rules set including a presentation identifier;
determining whether to present the training entity, the determining based on the training entity tag and the presentation rules set; and
presenting the training entity to the trainee on a trainee presentation based on the determining, the presenting including a portion of the integrated set of data representative of the training entity and the presentation identifier.

12. The non-transitory computer readable medium of claim 11, wherein the training entity is at least one of: a plurality of airborne and surface based entities, a plurality of subsurface entities, a plurality of space based entities and a plurality of Live, Virtual and Constructive challenges to the trainee.

13. The non-transitory computer readable medium of claim 11, wherein the plurality of sensors includes at least one of: a radar, an Identification Friend or Foe (IFF), a Radar Warning Receiver (RWR), a sensor pod, a sonar and an infrared sensor.

14. The non-transitory computer readable medium of claim 11, wherein the sensor data and truth data are representative of a Live training entity.

15. The method for tagging a training entity of claim 1, wherein the state data is representative of one of: a Live, Virtual and Constructive training entity.

16. The non-transitory computer readable medium of claim 11, wherein the simulation data is representative of Constructive training entity, the simulation data is originated via one of: an onboard data source and a remote data source.

17. The non-transitory computer readable medium of claim 11, wherein integrating each set of data representative of the training entity further comprises:
receiving each set of data representative of the training entity;
comparing a first set of data representative of the training entity with a second set of data representative of the training entity;

determining if the first and second set of data representative of the training entity represent a single training entity;

determining which of the first and second set of data representative of the training entity is a desired set of data representative of the training entity; and transmitting the desired set of data representative of the training entity.

18. The non-transitory computer readable medium of claim 11, wherein the training entity tag is further received via the training network and is at least one of: alive, dead, unknown, bogey, bandit, friendly, neutral, hostile, civilian, cyclops, outlaw and spades.

19. The non-transitory computer readable medium of claim 11, wherein receiving a presentation rules set further comprises storing the presentation rules set within an onboard data source.

20. The non-transitory computer readable medium of claim 11, wherein presenting the training entity to the trainee on a trainee presentation further comprises displaying the training entity to a trainee pilot within a flight deck display.

* * * * *